P. EIMANN.
APPARATUS FOR CUTTING AND WELDING METALS.
APPLICATION FILED JAN. 28, 1915.
1,162,587.
Patented Nov. 30, 1915.
3 SHEETS—SHEET 1.
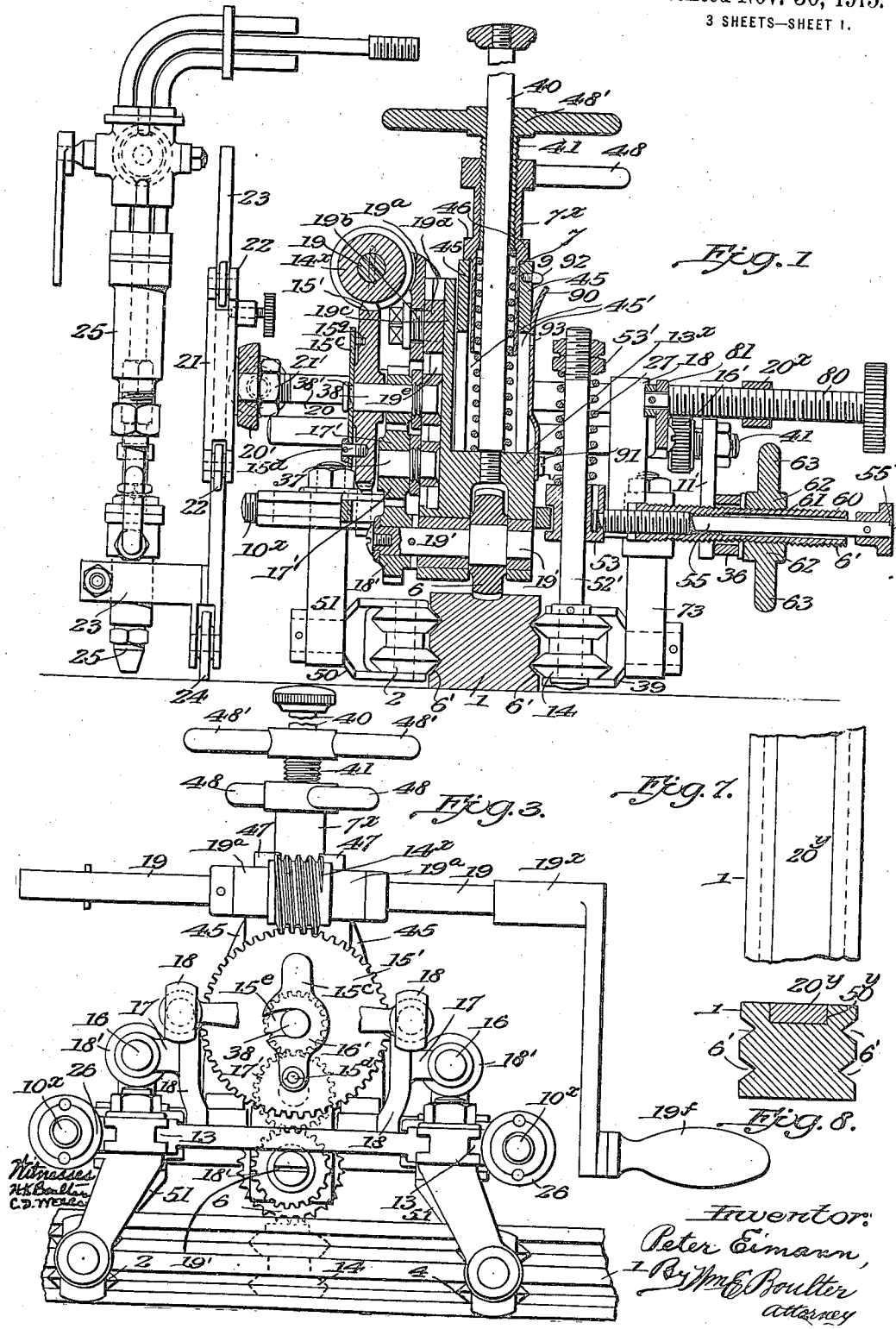

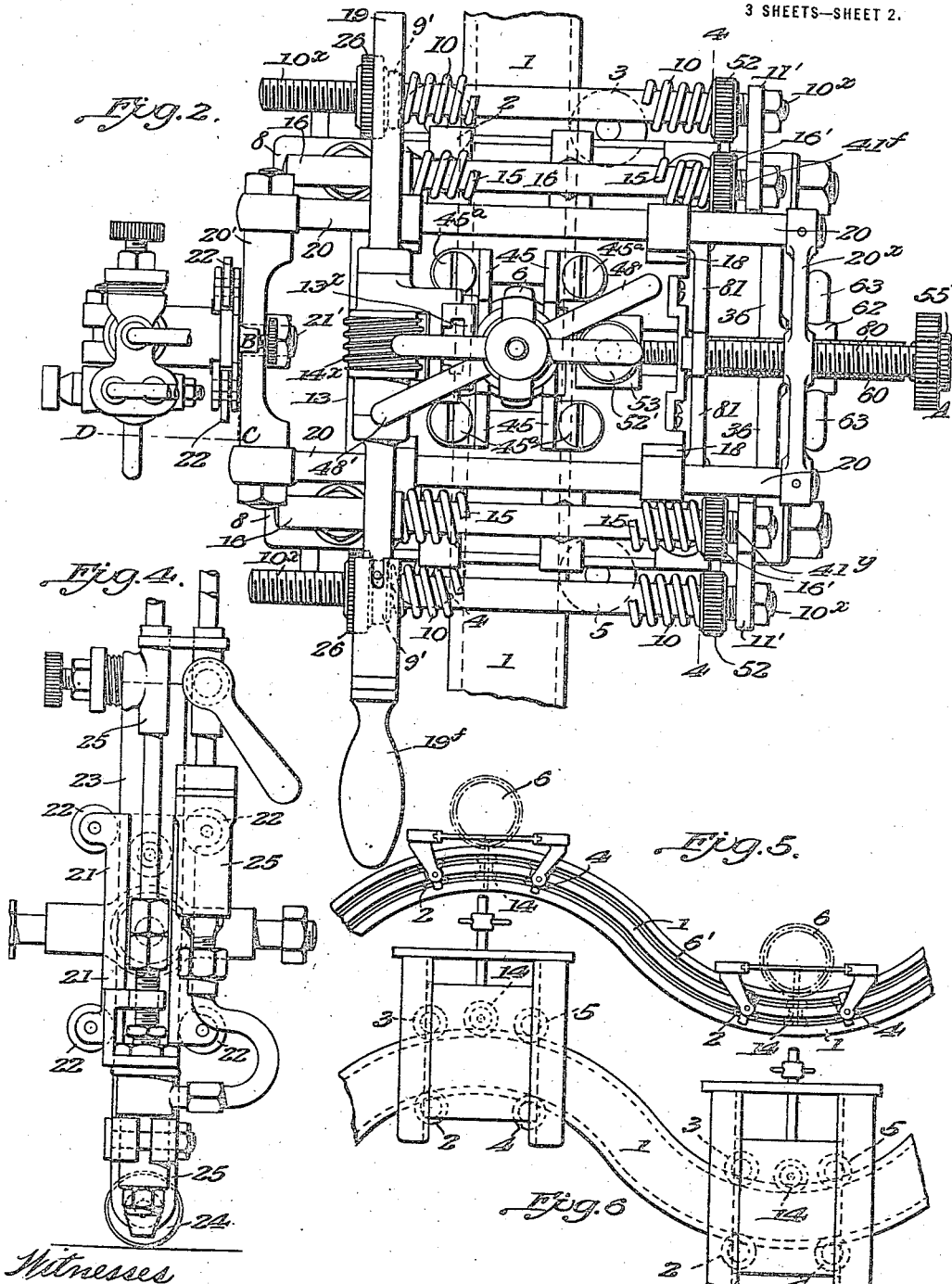

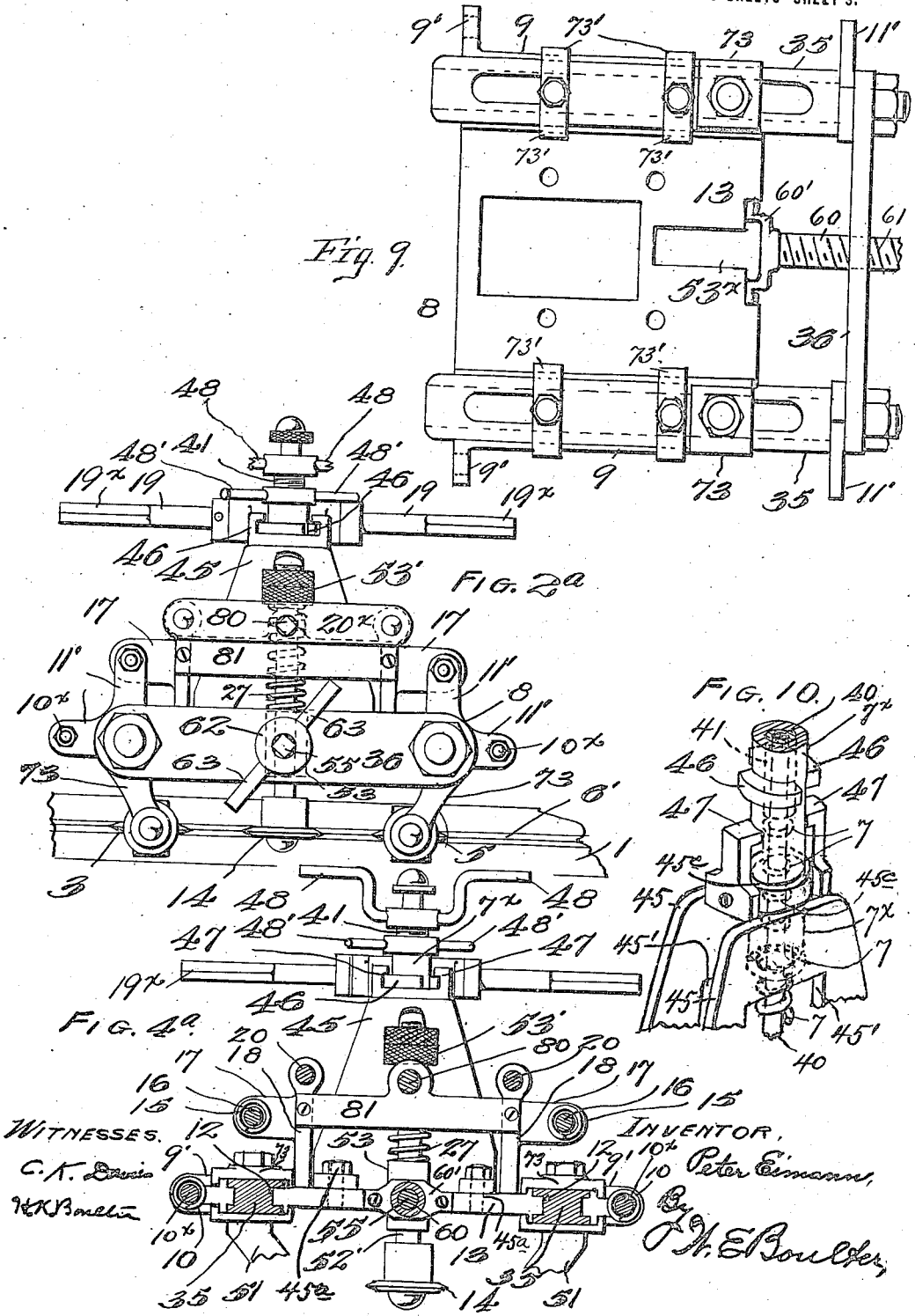

UNITED STATES PATENT OFFICE.

PETER EIMANN, OF PETROGRAD, RUSSIA.

APPARATUS FOR CUTTING AND WELDING METALS.

1,162,587.

Specification of Letters Patent. Patented Nov. 30, 1915.

Application filed January 28, 1915. Serial No. 4,973.

*To all whom it may concern:*

Be it known that I, PETER EIMANN, subject of the Emperor of Russia, and resident of Petrograd, in Russia, practical engineer, have invented a new and useful Improvement in Apparatus for Cutting and Welding Metals, of which the following is a specification.

This invention relates to apparatus for cutting and welding metals along curved lines by means of an oxy-hydrogen, oxy-acetylene, or other like burner, the improvements comprising, among other features, a guiding rail capable of being curved to the desired contour, a carriage carrying the burner and fitted to run upon said rail, and means for causing the carriage to travel along the rail.

When iron or steel is cut by means of an oxy-hydrogen, oxy-acetylene, or other burner it is often necessary to unite these metals again or divide them along variable curved lines in different planes. For the success of this operation the burner must be placed at an accurately determined distance from the work and it must be moved about with a suitable uniform speed. When this work is done by hand it is very difficult to fulfil these conditions and in all cases it demands very experienced workmanship.

The present invention provides an apparatus which allows the burner to be maintained and guided along any curved line according to the required conditions.

The invention consists in the novel construction, arrangement and combination of parts as hereinafter fully described, illustrated in the drawings and specifically pointed out in the appended claims.

In the drawings: Figure 1 represents a longitudinal section of the apparatus on the line A—B—C—D of Fig. 2. Fig. 2 is a top plan view. Fig. 2ª is a right end elevation of the parts as seen in Fig. 2. Fig. 3 is a front or left end view of the apparatus, the burner being omitted. Fig. 4 is a detail front view of the holder with the burner carried thereby. Fig. 4ª is a transverse sectional view on line 4—4 of Fig. 2. Figs. 5 and 6 show diagrammatically the position of the device on a guide rail. Fig. 7 is a plan view of a portion of a guide rail with a strip of soft metal pressed into it; Fig. 8 is a cross-section of said rail. Figs. 9 and 10 are plan and perspective views respectively hereinafter specifically referred to.

The apparatus is carried on a rail 1, of lead or other soft metal adapted to be easily bent or curved in the desired direction and applied to the pieces of metal to be operated on, where it is maintained in position by means of any suitable clamping arrangement to prevent it moving.

A carriage 8 of the apparatus is fitted to move along the rail 1 on rollers 2, 3, 4, 5 and 14 which run in grooves 6' cut in the rail on opposite sides thereof. These grooves may have any suitable shape. The carriage 8 comprises two longitudinal members or beams 35, a transverse beam 36, and a longitudinally slidable base member 13 adapted to be moved back and forth within slots 12 in the said members 35. The carriage 8 carries all the other operative elements of the machine and is caused to travel along the rail 1 by means now to be described.

6 indicates a sharp-toothed wheel mounted on a shaft 19' which is rotatably mounted in a supporting member or beam 13$^x$. The beam 13$^x$ is slidingly mounted within slots 45' in standards 45 secured to the base member 13 presently described, so that said beam and the parts carried thereby may be raised and lowered. When the beam 13$^x$ is sufficiently lowered, the toothed wheel 6 will engage with the upper face of the rail 1, and when the beam 13$^x$ is raised, said wheel 6 will free said rail. The carriage 8 with the parts supported thereby is adapted to be moved along the rail 1 by imparting rotation to the wheel 6 after the latter has been lowered into position to engage said rail, and I provide gearing for rotating the wheel 6, said gearing comprising a toothed gear wheel 18' mounted on shaft 19' and meshing with a toothed gear wheel 17' on stud shaft 37 carried by beam 13$^x$, and which gear wheel 17' gears with a toothed gear wheel 16' mounted on a shaft 38. The latter also carries a toothed gear wheel 15' with which meshes a worm wheel 14$^x$ mounted on a shaft 19 rotatably mounted in the fork of an arm 19ª which is adapted for vertical adjustment upon the upright portion 19$^c$ of the beam 13$^x$ and adapted to be secured in adjusted position by means of a clamping bolt 19$^b$ which passes through the arm 19ª and engages a block 19$^d$ slidingly arranged in the groove 19$^e$ formed between the arm 19ª and the portion 19°. The ends of the shaft 19 may be squared as at 19ˣ to enable an operating crank or handle 19ᵗ to be fitted thereon for rotating said shaft.

The gear wheel 15' is detachably mounted upon its shaft 38 by means of a latch 15ᶜ pivotally mounted at 15ᵈ to the said gear wheel and having a slot 15ᵉ within which lies a reduced portion 38' of the shaft 38 when the said gear wheel is in proper position on said shaft. By operating the latch so as to free the portion 38' of the shaft, the gear wheel 15' may be slipped off of said shaft. A stud 15ᵍ on the gear wheel 15' is adapted to engage the rear face of the latch so as to frictionally hold the latter in its locking position.

When the shaft 19 is turned in one direction the wheel 6 will be rotated through the media of the worm wheel 14ˣ, and gear wheels 15', 16', 17', 18' and the carriage 8 with the parts supported thereby is caused to travel in one direction along the rail 1 by reason of the sharp teeth of wheel 6 biting somewhat into the surface of the rail. When the shaft 19 is rotated in the opposite direction, the carriage will be caused to travel in a direction the reverse of that first mentioned.

In order that the wheel 6 may be caused to bite sufficiently deep into the upper face of the rail 1 to effect the movement of the carriage along said rail when said wheel 6 is rotated as above described, I provide a spiral spring 7 which encircles a vertical rod 40 carried by the beam 13ˣ. The lower end of said spring bears against the beam 13ˣ at a point above the wheel 6, and the upper end of the spring bears against the lower end of a sleeve 41. The latter is threaded exteriorly and screws within an interiorly threaded sleeve 7ˣ slidingly mounted within a collar 45ᶜ integral with the uprights 45 fixedly secured by bolts 45ª to the base member 13 of the carriage, which member at its longitudinal edges fits slidingly within grooves 12 on the inner sides of the longitudinal beams 35 of the carriage.

By screwing down the sleeve 41, the tension of the spring is increased, and the wheel 6 thereby caused to bite more or less deeply into the rail 1. After the wheel 6 has been caused to engage the rail 1 and is under the stress of the spring 7, said wheel should be locked in that position, otherwise owing to the tension which has been given to the spring by the screwing down of the sleeve 41, said spring would act to force the parts upwardly and carry the wheel 6 out of engagement with rail 1. I, therefore, provide a locking arrangement seen more clearly in Fig. 10, comprising two lugs 46 on the sleeve 7ˣ, which lugs, when the sleeve 7ˣ is rotated by arms or handles 48 secured to the upper end are adapted to engage beneath two angular pieces 47 secured to the collar 45ᶜ on the uprights 45. When the lugs are engaged beneath the pieces 47, the wheel 6 will be held against the rail 1, but when the sleeve 7ˣ is rotated about a quarter of a turn the lugs 46 will be freed from pieces 47, as seen in Fig. 10, and the sleeves 7ˣ, 41, and spring may be lifted, thus freeing the beam 13ˣ from the pressure of the spring, and said beam, together with the parts supported thereby, i. e. the various gear wheels and wheel 6 may be raised to thus cause said wheel 6 to free the rail. A leaf spring 90 is secured at its lower end by a screw 91 to the beam 13ˣ and is provided toward its upper end with an aperture 93 adapted to receive a stud 92 on one of the standards 45 when the beam 13ˣ and parts supported thereby have been raised sufficiently high to enable the stud 92 to enter said aperture. When this has occurred the parts will be held in elevated position until it is desired to lower the beam and parts carried thereby to enable the wheel 6 to engage the rail 1. By pressing the upper end of the spring outwardly to free the stud the beam, etc., will drop into a position with the wheel 6 engaging rail 1. The sleeve 41 is provided with arms 48' by which said sleeve may be readily rotated to vary the stress of the spring.

The two supporting rollers 2 and 4 are mounted directly in horizontal forks 50 carried by vertical brackets 51 secured to the longitudinal members 35 of the carriage. The two supporting rollers 3 and 5 are mounted directly in horizontal forks 39 carried by vertical brackets 73 secured to longitudinal bars 9 slidably mounted within guides 73' on the members 35 of the carriage. In order that the rollers 3 and 5 may be adjusted longitudinally to cause them to move toward the rail 1 and engage within the lateral grooves therein, or to cause said rollers to move away from the rail out of engagement with said grooves, I provide the bars 9 with laterally-extending lugs 9' through which loosely pass non-rotatable threaded shafts 10ˣ secured within arms 11' carried by the transverse member 36 of the carriage. A spiral spring 10 encircles each of the shafts 10ˣ, one end of each spring bearing against a lug 9' and the other end bearing against a nut 52 threaded on shaft 10ˣ. By rotating the nut in one or the other direction the tension of the spring 10 may be varied as desired. Upon each shaft 10ˣ is threaded a nut 26 by turning which in one direction the corresponding bar 9 may be caused to be adjusted longitudinally and thus cause the roller (3 or 5) carried by said bar 9 to be moved toward the lateral groove in rail 1 and engage therein. When the nut 26 is turned in the other direction the spring causes the bar 9 to be moved in a direction to cause the roller carried thereby to move away from and out of the groove in rail 1.

The roller 14 is mounted on the lower end of a vertical shaft 52' which passes loosely through a block 53 which can slide back and forth in a slot 53ˣ in the base member 13. By means of an adjusting screw 55 which at one end engages the block and whose other end projects beyond the transverse member 36 of the carriage, and carries a milled head or nut 55', the block and with it the shaft 52' and roller 14 may be shifted to cause the said roller to engage within the grooves 6' of rail 1, when said screw 55 is turned in one direction, and when the screw is turned in the opposite direction the block, shaft 52' and roller 14 will be shifted to cause the said roller to free the grooves. By reason of the shaft 52' carrying roller 14 being loosely mounted in block 53, said shaft and roller may move upwardly and downwardly according to different curvatures of the rail. A spiral spring 27 encircles the shaft 52' and bears at one end against a nut 53' threaded on the upper end of said shaft and at the other end against the block 53. Thus the roller 14 will be held in the grooves of rail 1 more or less firmly owing to the stress of the said spring 27. The tension of the spring may be varied by manipulating the nut 53'.

The slidable base member 13 carries two standards 18 which have arms 17 against which bears one end of spiral springs 15 encircling rods 16 mounted in the arms 17 and arms 11'. Nuts 16' are mounted on threaded portions 41ʸ of the rods 16 and against which nuts the other end of the springs 15 bears. By adjusting the nuts upon the shafts the tension of the said springs may be varied. The said springs operate to keep the base member (with the parts supported thereby) under a yielding pressure in a direction to the left as viewed in Figs. 1 and 2.

The adjusting screw 55 is threaded within a non-rotatable sleeve 60 which at one end is fixedly secured to a plate 60' bolted to the base member 13 and whose opposite end passes freely through the transverse member 36 of the carriage. The sleeve 60 is exteriorly threaded as at 61 and carries a nut 62 having arms 63 whereby the nut may be readily rotated upon the sleeve. When the nut is turned to the right it will bear against the transverse member 36 of the carriage and cause the rod to move toward the right as viewed in Figs. 1 and 2, and thus carry along with it the member 13 and the parts supported thereby, including the various gear wheels and wheel 6, which latter in said shifting movement of the member 13 will slide across the upper face of rail 1 until it is in the proper position thereover, when the rotation of nut 62 is discontinued.

Should it be desired to shift the member 13 in the opposite direction, i. e. toward the left as viewed in Figs. 1 and 2, the nut 62 is turned toward the left and the tension of the springs 15 exerted upon the standards 18 will cause the member 13 and parts thereon to be moved to the left, the extent of movement being determined by the extent to which the nut 62 is adjusted to the right on its sleeve 60.

Any suitable burner and holder therefor may be carried by the device and I have shown a burner 25 carried by an arm 23ˣ projecting from a plate 23 which is slidably mounted between four guiding rollers 22 mounted on a plate or holder 21 pivotally supported on a transverse rod 20' by means of a pivot stud 21'. The rod 20' forms part of a frame which comprises also longitudinal members 20 and transverse member 20ˣ which various members are slidably mounted in the standards 18 on base member 13. 24 is a roller at the lower end of plate 23. For adjusting the frame 20, 20', 20ˣ longitudinally to thereby vary the position of the burner relatively to the work, I provide a threaded rod 80 which is threaded through the member 20ˣ and turns freely at its inner end in a crosspiece 81 joining two of the standards 18. By turning the rod 80 to the right the frame and the burner supported thereby will be shifted toward the right as viewed in Figs. 1 and 2, and when the rod 80 is turned to the left, said frame and burner will be shifted to the left.

With my apparatus the cutting of metal may be effected in straight lines as well as in all kinds of curved lines, on straight, curved or spherical surfaces, which are concave or convex, in horizontal, inclined and vertical positions. For work in a straight line and for large quantities of special shaped parts, steel or cast iron rails 1 with lead or other soft metal 20ʸ pressed into a longitudinal groove 50ʸ are used (see Figs. 7 and 8). Such rails suffer less from falling, blows and careless handling in general than those made entirely of soft metal, and will serve for a very long time.

What I claim is:

1. In an apparatus of the character described, the combination with a guiding rail provided with grooves in its sides, of a carriage running on said rail, wheels on said carriage engaging with said grooves, a toothed wheel carried by said carriage and adapted to engage with the said rail, gearing for operating the said toothed wheel, and a burner carried by the carriage.

2. In an apparatus of the character described the combination with a guiding rail provided with grooves in its sides, and an insert of soft metal carried by said rail, of a carriage running on said rail, wheels on said carriage and engaging with said grooves, a toothed wheel carried by said carriage and adapted to engage with the said insert, gearing for operating the said toothed wheel, and a burner carried by the carriage.

3. In an apparatus of the character described, the combination with a guiding rail provided with grooves in its sides, of a carriage running on said rail, wheels on said carriage engaging in said grooves, a toothed wheel carried by said carriage and adapted to engage with the said rail, means for exerting downward pressure upon said toothed wheel, gearing for operating the toothed wheel, and a burner carried by the carriage.

4. In an apparatus of the character described, the combination with a guiding rail provided with grooves in its sides, of a carriage running on said rail, wheels on said carriage engaging with said grooves, a toothed wheel adapted to engage with said rail, a support movably mounted on the carriage and supporting said toothed wheel, a spring exerting pressure upon said support, gearing for operating the toothed wheel, and a burner carried by the carriage.

5. In an apparatus of the character described the combination with a guiding rail, of a carriage running upon said rail, a longitudinally shiftable frame mounted on said carriage, a burner pivotally carried by said frame, and means for shifting the said frame to vary the position of the burner.

6. In an apparatus of the character described the combination with a guiding rail, of a carriage running upon said rail, a longitudinally shiftable frame comprising longitudinal members and transverse members, standards on the carriage in which said longitudinal members are slidably mounted, a threaded rod screwing within one of the said transverse members, and a burner pivotally carried by the other transverse member of the frame.

7. In an apparatus of the character described the combination with a guiding rail provided with grooves in its sides, of a carriage adapted to travel upon said rail, wheels on said carriage engaging with said grooves, a toothed wheel adapted to engage with the upper face of the rail, a support in which said wheel is mounted, and a spring arranged to exert pressure upon said support.

8. In an apparatus of the character described the combination with a guiding rail provided in its sides with grooves, of a carriage adapted to travel upon said rail, wheels on said carriage adapted to engage with said grooves, a toothed wheel adapted to engage with the upper face of the rail, a support in which said wheel is mounted, a spring arranged to exert pressure upon said support, and means for varying the stress of the spring.

9. In an apparatus of the character described the combination with a rail having grooves in its sides, of a carriage adapted to travel upon said rail and comprising a slidingly-arranged member, wheels on said carriage engaging with said grooves, a toothed wheel adapted to engage the upper face of the rail, a support for said wheel mounted on said slidable member of the carriage, gearing mounted upon said support and adapted to effect the rotation of said toothed wheel, and means for adjusting the said slidable member of the carriage.

In testimony whereof, I have signed my name to this specification in the presence of two subscribing witnesses.

PETER EIMANN.

Witnesses:
 A. N. TSCHEXALOFF,
 H. A. LOVIAGUINE.